US011423501B2

(12) United States Patent
Refila et al.

(10) Patent No.: US 11,423,501 B2
(45) Date of Patent: Aug. 23, 2022

(54) MACHINE LEARNING FOR OPTIMAL STUDENT GUIDANCE

(71) Applicant: Oracle International Corporation, Redwood Shores, CA (US)

(72) Inventors: John Edward Refila, Springfield, VA (US); Christopher Stanwood Thompson, Austin, TX (US); Desiree Carvalho Dreszer, Atlanta, GA (US); Nyeri Leah Osibin, Kansas City, MO (US); Michael Rene Lauria, Los Angeles, CA (US); Alexander Winfield Thompson, Del Mar, CA (US)

(73) Assignee: Oracle International Corporation, Redwood Shores, CA (US)

( * ) Notice: Subject to any disclaimer, the term of this patent is extended or adjusted under 35 U.S.C. 154(b) by 575 days.

(21) Appl. No.: 16/565,963

(22) Filed: Sep. 10, 2019

(65) Prior Publication Data

US 2020/0134759 A1    Apr. 30, 2020

Related U.S. Application Data

(60) Provisional application No. 62/829,339, filed on Apr. 4, 2019, provisional application No. 62/797,700, filed
(Continued)

(51) Int. Cl.
*G06Q 50/20* (2012.01)
*G06N 20/00* (2019.01)
(Continued)

(52) U.S. Cl.
CPC ......... *G06Q 50/2053* (2013.01); *G06F 17/18* (2013.01); *G06K 9/6215* (2013.01);
(Continued)

(58) Field of Classification Search
CPC .. G06Q 50/2053; G06F 17/18; G06K 9/6215; G06K 9/6218; G06K 9/6267; G06K 9/6262; G06N 20/00
See application file for complete search history.

(56) References Cited

U.S. PATENT DOCUMENTS 5,727,950 A * 3/1998 Cook ................. G09B 5/14
434/350
10,528,329 B1 * 1/2020 Doyle ................. G06F 8/31
(Continued)

*Primary Examiner* — Aaron W Carter
(74) *Attorney, Agent, or Firm* — Invoke

(57) ABSTRACT

Techniques for training and evaluating machine-learning models for providing student guidance are described herein. In some embodiments, a network service generates a set of clusters that group a plurality of students by similarity. The network service trains a machine-learning model based on variances in outcomes and actions leading to the outcomes for students that belong to a same cluster in the set of clusters. The network service evaluates the machine-learning model for a student that has been mapped to the same cluster to identify at least one action that the student has not performed that is predictive of an optimal outcome for other students that belong to the same cluster. Responsive to evaluating the machine-learning model, the network service presents, through an interface, a recommendation that the student perform the at least one action.

20 Claims, 15 Drawing Sheets

Related U.S. Application Data on Jan. 28, 2019, provisional application No. 62/779,818, filed on Dec. 14, 2018, provisional application No. 62/779,810, filed on Dec. 14, 2018, provisional application No. 62/779,812, filed on Dec. 14, 2018, provisional application No. 62/779,937, filed on Dec. 14, 2018, provisional application No. 62/769,942, filed on Nov. 20, 2018, provisional application No. 62/769,937, filed on Nov. 20, 2018, provisional application No. 62/752,609, filed on Oct. 30, 2018.

(51) Int. Cl.
*G06F 17/18* (2006.01)
*G06K 9/62* (2022.01)

(52) U.S. Cl.
CPC ......... *G06K 9/6218* (2013.01); *G06K 9/6267* (2013.01); *G06N 20/00* (2019.01)

(56) References Cited

U.S. PATENT DOCUMENTS

| | | | |
|---|---|---|---|
| 10,705,796 B1* | 7/2020 | Doyle | G06N 5/003 |
| 11,151,672 B2* | 10/2021 | Terra | G06Q 50/2053 |
| 2010/0159437 A1* | 6/2010 | German | G09B 7/02 |
| | | | 707/E17.046 |
| 2013/0290905 A1* | 10/2013 | LuVogt | G06N 3/006 |
| | | | 715/835 |
| 2014/0040156 A1* | 2/2014 | Carroll | G06Q 50/20 |
| | | | 705/327 |
| 2014/0065592 A1* | 3/2014 | Strang | G09B 5/00 |
| | | | 434/350 |
| 2017/0124894 A1* | 5/2017 | Essafi | G06F 30/20 |
| 2018/0349388 A1* | 12/2018 | Skiles | G06N 20/10 |
| 2019/0295114 A1* | 9/2019 | Pavletic | G06K 9/6256 |
| 2020/0074874 A1* | 3/2020 | Lathrop | G09B 7/04 |
| 2020/0302296 A1* | 9/2020 | Miller | G06N 20/20 |
| 2022/0067814 A1* | 3/2022 | Goncalves | G06Q 30/0631 |

* cited by examiner

Welcome John

🏠 HOME 📄 DOCUMENTS 🔔 NOTIFICATIONS ✉ FINANCIAL   ⬤ [JOHN DOE]▼

| SEP 2015-JUN 2016 | SEP 2016-JUN 2017 | SEP 2017-JUN 2018* | SEP 2018-JUN 2019 | ALL |

Your Financial Aid Summary For Academic Year Sep 1, 2017 - Jun 1, 2018

1 How much does my education cost?

| | |
|---|---|
| Cost of Attendance | $20,000.00 |
| Tuition & Fees | $10,000.00 |
| Estimated Living & Other Expenses | $10,000.00 |

2 How much Financial Aid can I receive?

| Award Name | Award Status | Offered to You | Amount you'll receive | |
|---|---|---|---|---|
| Pell Grant | Awarded | $5,920.00 | $5,920.00 | |
| FSEOG | Awarded | $1,000.00 | $1,000.00 | |
| Direct Subsidized Loan | Awarded | $4,500.00 | Requires Acceptance | Update Acceptance |
| Direct Unsubsidized Loan | Awarded | $6,000.00 | Requires Acceptance | Update Acceptance |
| | | $17,420.00 | $6,920.00 | |

$5,920.00 Pell Grant | $1,000.00 FSEOG | $3,080.00 Under-funded
Cost: $10,000.00

You are UNDERFUNDED for Academic Year Sep 1, 2017 - Jun 1, 2018. You need $3,080.00 to cover your remaining tuition and fees. You can accept more funds to cover these costs. Adjust my Funding

FIG. 5B

( 1 Summary )─( 2 Accept Loans )─( 3 Confirm )─( 4 E-Sign )─( 5 Done )

530

Step 2 - Accept your Awards

Please select the amount required to cover the costs necessary to attend school for the upcoming year. You are eligible for a maximum of $10,500.00, but we recommend accepting $3,080.00, the amount required to cover your remaining tuition and fee costs.

| Award Name | Award Eligibility | Amount to accept to cover my remaining costs |
|---|---|---|
| Direct Subsidized Loan | $4,500.00 | $3,080.00 |
| Direct Unsubsidized Loan | $6,000.00 | $0.00 |

532

I would like to Accept
● $3,080.00, the amount to fully cover my remaining Tuition/Fees
○ Another amount Help me calculate my living expense
○ I would like to decline my funds that require acceptance Fill in the amounts that you expect to pay for each category below
Academic Year Sep 1, 2017 - Jun 1, 2018 (9 months)
Per Term Items
  Books                                                50
  Supplies                                             50
Monthly Items                              Enter $ amount   0
  Rent/Housing                             Enter $ amount
  Car Payment                              Enter $ amount
  Car Insurance                            Enter $ amount
  Gasoline                                 Enter $ amount
  Misc.                                    Enter $ amount
Daily Items                                              0
  Public Transportation                    Enter $ amount
  Food                                     Enter $ amount
                                           Enter $ amount
                                           Enter $ amount
                                           Enter $ amount Estimated Living Expenses for Year                $100.00

CANCEL | RESET | DONE

Welton College — Welcome John

SEP 2015-JUN 2016  SEP 2016-JUN 2017  SEP 2017-JUN 2018*  SEP 2018-JUN 2019  ALL

Your Financial Aid Summary For Academic Year Sep 1, 2017 - Jun 1, 2018

1. How much does my education cost?

| | |
|---|---|
| Cost of Attendance | $20,000.00 |
| Tuition & Fees | $10,000.00 |
| Estimated Living & Other Expenses | $10,000.00 |

2. How much Financial Aid can I receive?

| Award Name | Award Status | Offered to You | Amount you'll receive |
|---|---|---|---|
| Pell Grant | Awarded | $5,920.00 | $5,920.00 |
| FSEOG | Awarded | $1,000.00 | $1,000.00 |
| Direct Subsidized Loan | Awarded | $4,500.00 | $4,500.00 |
| Direct Unsubsidized Loan | Awarded | $6,000.00 | $570.00 |
| | | $17,420.00 | $11,990.00 |

$5,920.00 Pell Grant  $1,000.00 FSE  $4,500.00 Direct Subsidized Loan  570.0
Cost: $10,000.00

You are OVERFUNDED for Academic Year Sep 1, 2017 - Jun 1, 2018. You will receive an excess of $1,990.00 to cover your living and other expenses, which amounts to about $221.11 per month. Make sure that you do not spend more than what you have available per month.

If you don't absolutely need $221.11 per month to cover living expenses OR if the amount is not sufficient to cover your living expenses, consider adjusting your funding. If you aren't sure what you need to cover your living expenses, click here: Help me calculate my living expenses. If you haven't completed loan entrance counseling. It is highly recommended that you do so to understand how to borrow money responsibly. Complete Loan Entrance Counseling.

550 ─▶

| $5,920.00 Pell Grant | $1,000.00 FSE | $4,500.00 Direct Subsidized Loan | 570.0 |
| Cost: $10,000.00 |

You are OVERFUNDED for Academic Year Sep 1, 2017 - Jun 1, 2018. You will receive an excess of $1,990.00 to cover your living and other expenses, which amounts to about $221.11 per month. Make sure that you do not spend more than what you have available per month.

If you don't absolutely need $221.11 per month to cover living expenses OR if the amount is not sufficient to cover your living expenses, consider adjusting your funding. If you aren't sure what you need to cover your living expenses, click here: Help me calculate my living expenses. If you haven't completed loan entrance counseling, it is highly recommended that you do so to understand how to borrow money responsibly. Complete Loan Entrance Counseling.

552 ─▶ ꜜ When am I scheduled to receive my financial aid?

*Future Disbursements*

| Award Name | Scheduled Disbursement Date | Amount |
|---|---|---|
| Pell Grant | Sep 1, 2017 | $2,960.00 |
|  | Jan 15, 2018 | $2,960.00 |
| FSEOG | Sep 1, 2017 | $500.00 |
|  | Jan 15, 2018 | $500.00 |
| Direct Subsidized Loan | Sep 1, 2017 | $2,250.00 |
|  | Jan 15, 2018 | $2,250.00 |
| Direct Unsubsidized Loan | Sep 1, 2017 | $285.00 |
|  | Jan 15, 2018 | $285.00 |

*Received Disbursements*

| Award Name | Disbursement Date | Amount |
|---|---|---|
| *No Disbursement Information Available* | | |

FIG. 5J

MACHINE LEARNING FOR OPTIMAL STUDENT GUIDANCE

BENEFIT CLAIMS; RELATED APPLICATIONS; INCORPORATION BY REFERENCE

This application claims the benefit of U.S. Provisional Patent Application 62/769,942, filed Nov. 20, 2018, titled "Machine Learning for Optimal Student Guidance"; U.S. Provisional Patent Application 62/752,609, filed Oct. 30, 2018, titled "Predictive Financial Aid Package"; U.S. Provisional Patent Application 62/769,937, filed Nov. 20, 2018, titled "Contextual Student Guidance System"; U.S. Provisional Patent Application 62/779,937, filed Dec. 14, 2018, titled "Autonomous Data Sourcing and Verification"; U.S. Provisional Patent Application 62/779,810, filed Dec. 14, 2018, titled "Career Outlook Analysis System"; U.S. Provisional Patent Application 62/779,812, filed Dec. 14, 2018, titled "Financial Aid Outlook Analysis System"; U.S. Provisional Patent Application 62/779,818, filed Dec. 14, 2018, titled "Hypothetical Financial Aid Packaging"; U.S. Provisional Patent Application 62/797,700, filed Jan. 28, 2019, titled "Systems and Methods for Automation Holds"; U.S. Provisional Patent Application 62/829,339, filed Apr. 4, 2019, titled "Modifying Rules or Processes that Trigger Automation Holds", the entire contents for each of which are hereby incorporated by reference.

TECHNICAL FIELD

The present disclosure relates to machine learning to optimize outcomes. In particular, the present disclosure relates to scalable systems and processes for training and evaluating machine learning models to provide real-time guidance to students.

BACKGROUND

Student guidance programs generally involve systems and tools designed to optimize access, affordability, and admission outcomes for students. For example, many educational institutions provide school counseling to students, whereby an adviser helps students formulate a plan to successfully attain academic and career objectives. Well-formulated student plans may lead to better student retention rates and student outcomes.

The complexity and variability of various factors may lead to sub-optimal guidance being provided to a student. For example, a financial aid package may require thousands of data elements and rules to determine student eligibility. Further, the data elements and rules for determining eligibility may evolve over time during the student lifecycle. As a result, determining an optimal financial aid package for a student is typically a complicated, lengthy, and error-prone process. Errors in the process may trigger sub-optimal financial aid packages being recommended for the student, negatively impacting access, affordability, and academic outcomes for the student and the educational institution.

In some cases, advisers or students may use assistive tools to help reduce the risk of error when formulating a plan. For example, an adviser or student may input a set of data elements into an automated application to determine whether the student is eligible for a particular grant. While this approach may reduce some of the errors and uncertainty around student eligibility, inputting the set of data elements may be a cumbersome and time-consuming process. As a result, this approach is difficult to scale well in large systems, such as in systems where a single adviser may be assigned to hundreds of students. In addition, this approach fails to effectively capture trends and outcomes for students that may share similar profiles, which may lead to sub-optimal guidance for a student.

Adding to the complexity, student eligibility may change during the student's life cycle for a variety of reasons, such as a shift in the current academic state of a student or a change in eligibility rules. The student may be caught unaware when and why a change occurs. Students often rely on university staff to analyze and explain why the change occurred. However, advisors are generally not able to provide real-time processing to assess the impact when new input is received. Rather, advisors are generally limited to re-assessing the student's plan at given intervals. This approach reduces the student experience and visibility into the system, which negatively impacts the student's ability to make informed decisions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 5A-J illustrate example interfaces for providing contextual guidance to students in order to achieve optimal student funding in accordance with some embodiments;

DETAILED DESCRIPTION

Figure 1:
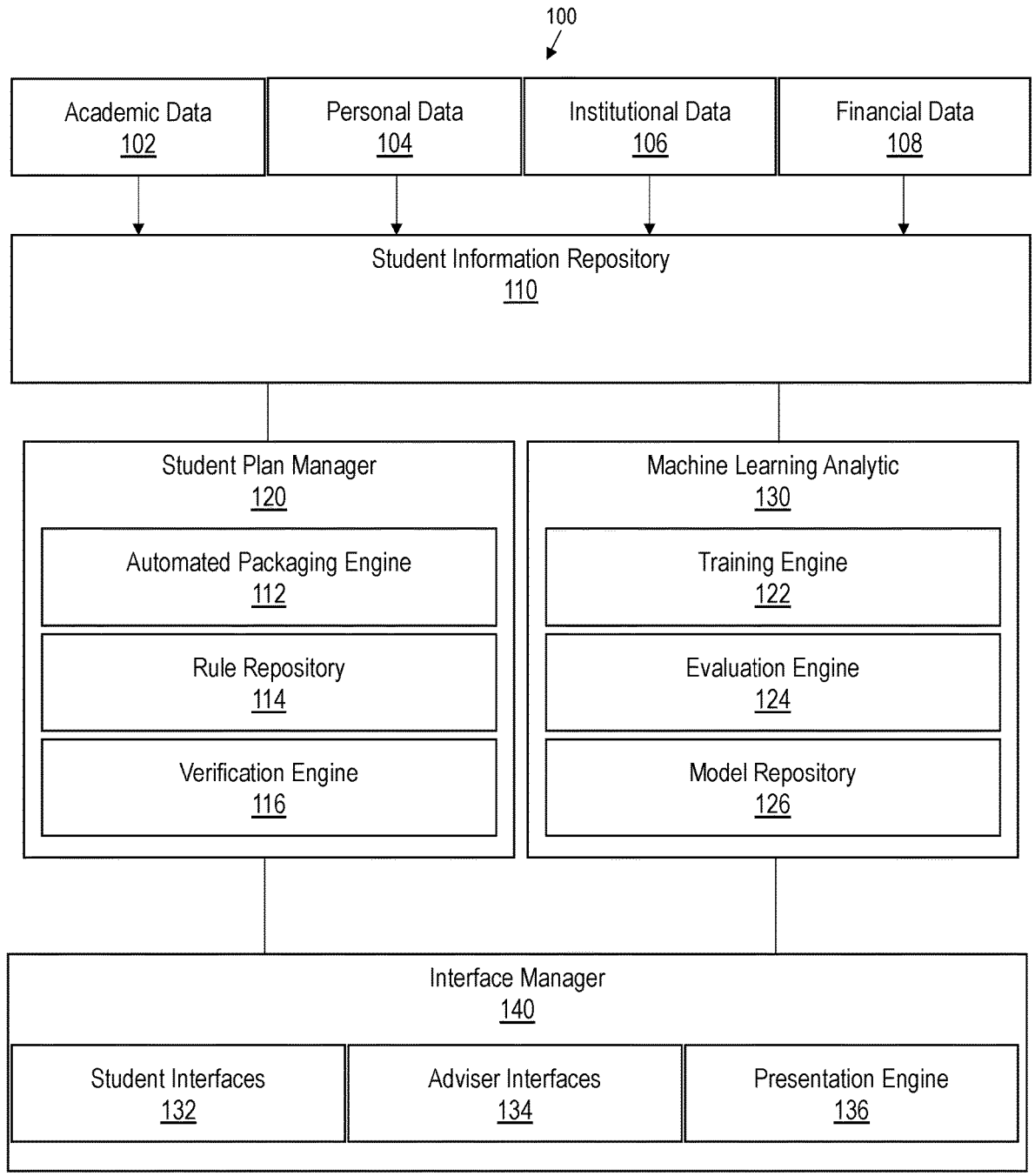
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.
1. GENERAL OVERVIEW
2. SYSTEM ARCHITECTURE
3. TRACKING STUDENT OUTCOMES
4. SUPERVISED AND UNSUPERVISED LEARNING OF
    PATTERNS LEADING TO OPTIMAL OUTCOMES 5. REAL-TIME MODEL EVALUATION AND INTERFACE PRESENTATION
6. COMPUTER NETWORKS AND CLOUD NETWORKS
7. MICROSERVICE APPLICATIONS
8. HARDWARE OVERVIEW
9. MISCELLANEOUS; EXTENSIONS

1. General Overview

Techniques are described herein for leveraging machine learning to provide contextual student guidance. The techniques may be integrated into an artificial intelligence (AI) enabled platform, such as an AI-enabled cloud service, to provide actionable analytics leading to higher rates of success for institutions and students. For example, the AI-enabled platform may automatically learn behavioral patterns that result in optimal funding, student retention, academic success, and/or careers success. The platform may evaluate the learned patterns to identify actions that are predictive of success for students that fit a given profile. The platform may then provide automated guidance to students based on what actions are most likely to lead to an optimal outcome.

In some embodiments, students are provided access to the AI-enabled guidance platform through a network service. For example, a student may sign up for or otherwise access the network service when applying for and/or matriculating with an educational institution. The network service may monitor student data, including student profile information, actions taken by the student, and current outcomes for the student. The network service may provide individually tailored student advisement based on the current status of the student by evaluating similar profiled students that had successful outcomes. As more student data is received, the automated guidance may be updated in real-time to provide near instantaneous guidance to the student over the student's career.

In some embodiments, the AI-enabled platform is configured to train and evaluate machine learning models. During the training phase, the AI-enabled platform generates a set of model components (also referred to as artifacts) that capture patterns in a set of training data. The set of training data in this context may generally comprise a set of inputs (e.g., student profile information, student actions, and/or other student data) and a set of corresponding outputs (e.g., financial, academic, and/or career outcomes). Students that have similar features may be clustered together. The variances in outcomes may then be analyzed to determine which students had the most optimal outcomes. For example, the machine learning process may identify students that graduated with the lowest amount of debt, the greatest amount of funding, and/or the most academic success. The machine-learning model may identify the actions (also referred to herein as triggers) that led to the optimal outcomes.

During the evaluation phase, a student is mapped to a cluster of students sharing similar features in accordance with some embodiments. By evaluating similar profiled students, the system may recommend actions that the student has not yet taken and generate student plans that are predictive of optimal outcomes. For example, the system may generate similar financial plans for similarly profiled students. Additionally or alternatively, the system may advise the student of how much eligible financial aid to accept in order to minimize debt, thereby promoting responsible borrowing. As another example, the system may recommend certain class schedules, organizations, and/or other activities that are most likely to lead to academic and/or career success.

If the inputs affecting a student profile change, then the machine-learning model may be reevaluated to provide real-time guidance. For example, the recommended actions may vary depending on a student current grade point average (GPA). If the student's GPA increases, then the AI-enabled platform may identify a scholarship and/or other source of funding for which the student has become newly eligible. The AI-enabled platform may recommend that the student adjust the current financial plan by accepting the scholarship funds and reducing private/public loans to reduce the overall student debt burden. Such feedback may be provided to the student on a real-time basis, helping to optimize student outcomes in an efficient and scalable fashion.

Some embodiments described in this Specification and/or recited in the claims may not be included in this General Overview section.

2. Architectural Overview

FIG. 1 illustrates system 100 in accordance with some embodiments. As illustrated in FIG. 1, system 100 includes student information repository 110, student plan manager 120, machine learning analytic 130 and interface manager 140. System 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, student information repository 110 is any type of storage unit and/or device (e.g., a file system, collection of tables, or any other storage mechanism) for storing student information. Further, student information repository 110 may include multiple different storage units and/or devices. The multiple different storage units and/or devices may or may not be of the same type or located at the same physical site. Further, student information repository 110 may be implemented or may execute on the same computing system as other components of system 100. Alternatively, or additionally, the student information repository 110 may be implemented or executed on a computing system separate the other components of system 100. Student information repository 110 may be communicatively coupled to the other components via a direct connection or via a network.

In some embodiments, system 100 is a network service, such as web service, software-as-a-service (SaaS), or other cloud service. Students from one or more educational institutions may register with system 100 to create accounts with the service. System 100 may link a student account for a student with an adviser account for an adviser responsible for providing guidance to the student. A student and adviser account may have shared access to information about the student plan, current and projected outcomes, and/or other student information. Other information may be restricted to one account or the other. For example, the adviser account may have access to information for multiple student plans and adviser-specific data that is not accessible via the student account. The student account may have access to private, student-specific data that is not accessible via the adviser account.

In some embodiments, when a student creates an account with or is otherwise added to system 100, student information repository 110 is populated with student information from a variety of sources and/or systems. Student information repository 110 may include a variety of data related to students, such as academic data 102, demographic data 104, institutional data 106, and financial data 108. Examples sources and systems of student information may include, but are not limited to, databases, filesystems, and network services belonging to or otherwise associated with educational institutions, government institutions, corporate entities, and third-party sources. Additionally or alternatively, a student or other user may submit student information directly to system 100.

In some embodiments, academic data 102 includes information about a student's prior or current courses such as admission information, grade point averages, individual grades, enrollment status, class size, attendance, professors, and major. Additionally or alternatively, academic data 102 may include feedback, participation scores, and/or evaluations. As an example, academic data 102 may include a narrative evaluation of a student's performance in a capstone project. As another example, academic data 102 may include graduation dates for prior students and anticipated graduation dates for current students. Student information repository 110 may be connected with records department databases of one or more universities, high schools, and/or other educational institutions for updating academic data 102. Student information repository 110 may be synchronized with the databases to capture changes in the records department databases on a real-time basis.

In some embodiments, demographic data 104 includes information about a student's personal identity and background. For example, demographic data 104 may identify a student's ethnicity, gender, age, residence, employments status, entity affiliations, personal connections, parent identities, parent incomes, and student dependency status. Demographic data 104 may be collected from one or more sources, such as from educational institutions, social networks, internet service providers (ISPs), email services, and/or other sources that have access to a student's personal data. Student information repository 110 may be connected, either directly or indirectly, with one or more of these sources to collect demographic data 104. Collection may be prevented unless a student explicitly approves or opts-in to the service.

In some embodiments, institutional data 106 includes information about institutions associated with a student. For example, institutional data 106 may identify the name, location, tuition, and other information about an educational institution in which the student is matriculated. Additionally or alternatively, institutional data may include information related to in-person or online interactions of a student with an institution, such as surveys, student service requests, student card system data, and/or parking system data.

In some embodiments, financial data 108 includes information about the current and previous financial status of a student. Financial data 108 may include, for example, information identifying scholarships, loans, grants, and/or other sources of student funding. In some embodiments, financial data is extracted from Institutional Student Information Records (ISIR), which are records that are transmitted, either periodically or on-demand, by the Central Processing System (CPS). The CPS is an automated system managed by the Department of Education that processes applications for Federal Student Aid (FSA) and determines financial aid eligibility. The ISIR is a fixed-length record that includes various financial data associated with a student located at message positions following a particular communications protocol. For example, the ISIR may begin with Free Application for Federal Student Aid (FAFSA) information and include National Student Loan Data System (NSLDS) financial aid history information located at the end of the message. Additionally or alternatively, financial information may be extracted from other sources. For example, financial aid information may be extracted from the source of the funding, such as the source of a private scholarship, the educational institution where the scholarship is being applied, or may be input directly by a user.

System 100 may include one or more representational state transfer (REST) endpoints to expose RESTful services to clients. A REST endpoint may map uniform resource indicator and hypertext transfer protocol (HTTP) methods/messages to a particular resource or functionality provided by the network service. For example, a client may invoke or otherwise trigger one or more functions provided by machine learning analytic 130 and/or interface manager 140. A REST endpoint allows clients to submit stateless calls to access the network service. With a stateless call, the server processing a request does not maintain a state for the client. This approach allows the REST endpoint to be distributed across multiple servers in a cluster without having to tie a series of client requests to a specific server. As a result, a RESTful architecture allows system 100 to be highly scalable.

In some embodiments, student information repository 110 is populated with information extracted from REST-based messages. For example, a Student and Academic Information (SAFI) message may be defined as a REST-based extensible markup language (XML) API message that captures a snapshot of a student at a current point in time. A SAFI message may identify any combination of academic, demographic, financial, and institutional data previously mentioned. The SAFI message may serve as a coarse-grained message that provides a full snapshot of the current academic and financial state of a student. In some implementations, system 100 may populate student information repository 110 with data extracted from SAFI messages. Additionally or alternatively, system 100 may gather information from other sources in addition or as an alternative to the information extracted from REST-based messages. For example, system 100 may periodically receive ISIR messages from the CPS of the Department of Education in addition to receiving SAFI messages from one or more educational institutions.

In some embodiments, system 100 includes student plan manager 120, which comprises logic for tracking and optimizing student plans. Student plan manager 120 may track current or projected outcomes for a student. For example, student plan manager 120 may track current or projected values for the student's declared major, course requirements, course schedule, grade point average, available student resources, financial aid disbursements and estimated cost of attendance.

In some embodiments, student plan manager 120 comprises automated packaging engine 112 and rule repository 114. Automated packaging engine 112 may be configured to receive a set of inputs from student information repository 110, evaluate a set of rules from rule repository 114 against the set of inputs, and output a set of student outcomes. Rule repository 114 may store rules definitions for various potential student outcomes. For example, rule repository 114 may store rules for determining how much money will be disbursed to a student, the source of the disbursement (e.g., loan, scholarship, or other financial aid fund) and when the money will be disbursed. As another example, rule repository 114 may store a rule definition for computing an estimated cost of attendance for the student based on the student's scheduled attendance for their program, which can include: tuition, cost for materials, housing, transportation, etc. A rule definition may specify the input variables and data types required to evaluate the rule and the output variables and data types that are generated.

In some embodiments, student plan manager 120 includes verification engine 116. Verification engine 116 may manage restrictions on which accounts are able to access student plan information. For example, the student outcomes and other information associated with a student plan may be persisted in an encrypted format. Different accounts with the network service may be associated with different asymmetric (e.g., a public-private key pairing) and/or symmetric keys (e.g., a session key). REST-based requests to access a student plan may include one or more cryptographic keys to authenticate a user. If the keys do not match or the user otherwise fails to be properly authenticated, verification engine 116 may prevent access to the student data.

In some embodiments, system 100 includes machine learning analytic 130. Machine learning analytic 130 may include training engine 122, evaluation engine 124, and model repository 126. In some embodiments, machine learning analytic 130 leverages the inputs and outputs of automated packaging engine 112 to train and evaluate machine learning models, as described in further detail below.

Training engine 122 is configured to train a set of models that capture patterns in student behavior that lead to optimal outcomes. Machine learning models may be predictive and/or prescriptive in nature. Predictive models may be trained to predict the likelihood of outcomes given the current state of a student. For example, a predictive model may predict graduation dates, grades, financial outcomes (e.g., eligible financial aid, predicted debt levels, etc.), and/or any other student outcome. A prescriptive model may recommend actions to correct sub-optimal outcomes currently experienced by a student. For example, a prescriptive model may be trained to learn actions that are most successful in correcting a lack of funding for a student. As another example a prescriptive model may be trained to learn actions (e.g., tutoring, resources) that are most likely to help a student avoid or respond to academic probation. Techniques for training models are described further below in Section 4, titled "Supervised and Unsupervised Learning of Patterns Leading to Optimal Outcomes."

Evaluation engine 124 evaluates trained models to identify actions that are most likely to lead to optimal outcomes for a student. For example, evaluation engine 124 may identify the most optimal funding sources for which the student is eligible and that have led to the least amount of debt for students with similar profiles. As another example, evaluation engine 124 may identify actions that other students with similar profiles have taken that have successfully been hired by a particular employer. The models may be evaluated to identify actionable analytics to present to students and/or advisers.

Model repository 126 comprises volatile and/or non-volatile storage for storing machine learning models. Example machine learning models that may be stored include, but are not limited to, binary classification models, multiclass classification models, regression models, and/or neural networking models. A model may comprise components (also referred to as artifacts) that map a set of inputs (e.g., student attributes, actions, etc.) to a classifier/predicted outcome (e.g., financial, academic, career, etc.) with a corresponding confidence level.

Interface manager 140 includes logic for generating and updating interfaces, according to some embodiments. For example, interface manager 140 may generate and manage student interfaces 132 and adviser interfaces 134, which may serve as front-end access points for end users, such as students and advisers. Student interfaces 132 and adviser interfaces 134 may include, but are not limited to, a graphical user interface (GUI), an application programming interface (API), a voice user interface, and a web-based user interface (e.g., a web page or series of interrelated web pages).

An interface may comprise several different components and/or display elements. Examples include, but are not limited to, menus, hyperlinks, icons, text fields, images, display panes, windows, graphical control elements, tabs, checkboxes, radio buttons, dropdown lists, list boxes, buttons, toggles, date and time selectors, command lines, sliders, pages, and forms. The functional and display format may vary from one interface to the next and may be customizable by a user.

Different components of an interface may be specified in different languages. The behavior of user interface elements may be specified in a dynamic programming language, such as JavaScript. The content of user interface elements is specified in a markup language, such as hypertext markup language (HTML) or extensible markup language (XML) User Interface Language (XUL). The layout of user interface elements is specified in a style sheet language, such as Cascading Style Sheets (CSS). Alternatively, retention interface 120 is specified in one or more other languages, such as Java, C, or C++.

In some embodiments, student interfaces 132 and/or adviser interfaces 134 may display information at various levels of granularity. For example, an interface may display a set of current and/or projected student outcomes. A user may click on or otherwise select one of the outcomes to drill down identify further details regarding student outcomes, such as the triggers that caused the outcome, changes from a previous outcome, and details about why there was a change in outcome. As another example, a user may click on or otherwise select a recommended action to be presented with more information about the action or to initiate the action.

In some embodiments, interface manager 140 comprises presentation engine 136 to generate interface elements based on the actionable analytics provided by machine learning analytic 130. For example, presentation engine 136 may generate display elements for recommending a particular scholarship or grant that is predicted to reduce the student debt burden. As another example, presentation engine 136 may provide access (e.g., via hyperlinks and/or other interface elements) to particular resources that are predicted to increase academic, career, and/or other student outcomes. Presentation engine 136 may present the recommendations via one or more interface elements within student interfaces 132 and/or adviser interfaces 134.

Additional embodiments and/or examples relating to computer networks and microservice applications are described below in Section 6, titled "Computer Networks and Cloud Networks" and Section 7, titled "Microservice Applications", respectively.

3. Identifying Triggers for Changed Student Outcomes

In some embodiments, system 100 maintains an audit-trail of changes and corresponding student outcomes. For example, system 100 may monitor changes in GPA, loan history, declared majors, coursework, and/or other student data. In response to detecting a change, system 100 may determine whether any student outcomes have also changed. For example, system 100 may determine whether a change in the student data triggered any changes in the financial aid eligibility based on regulations and/or financial aid policy restrictions. Additionally or alternatively, system 100 may determine whether there were any changes in the disbursement dates of the funds and/or other student outcomes. If a change is detected, system 100 may persist the changed outcome and the trigger that caused the change.

Figure 2:
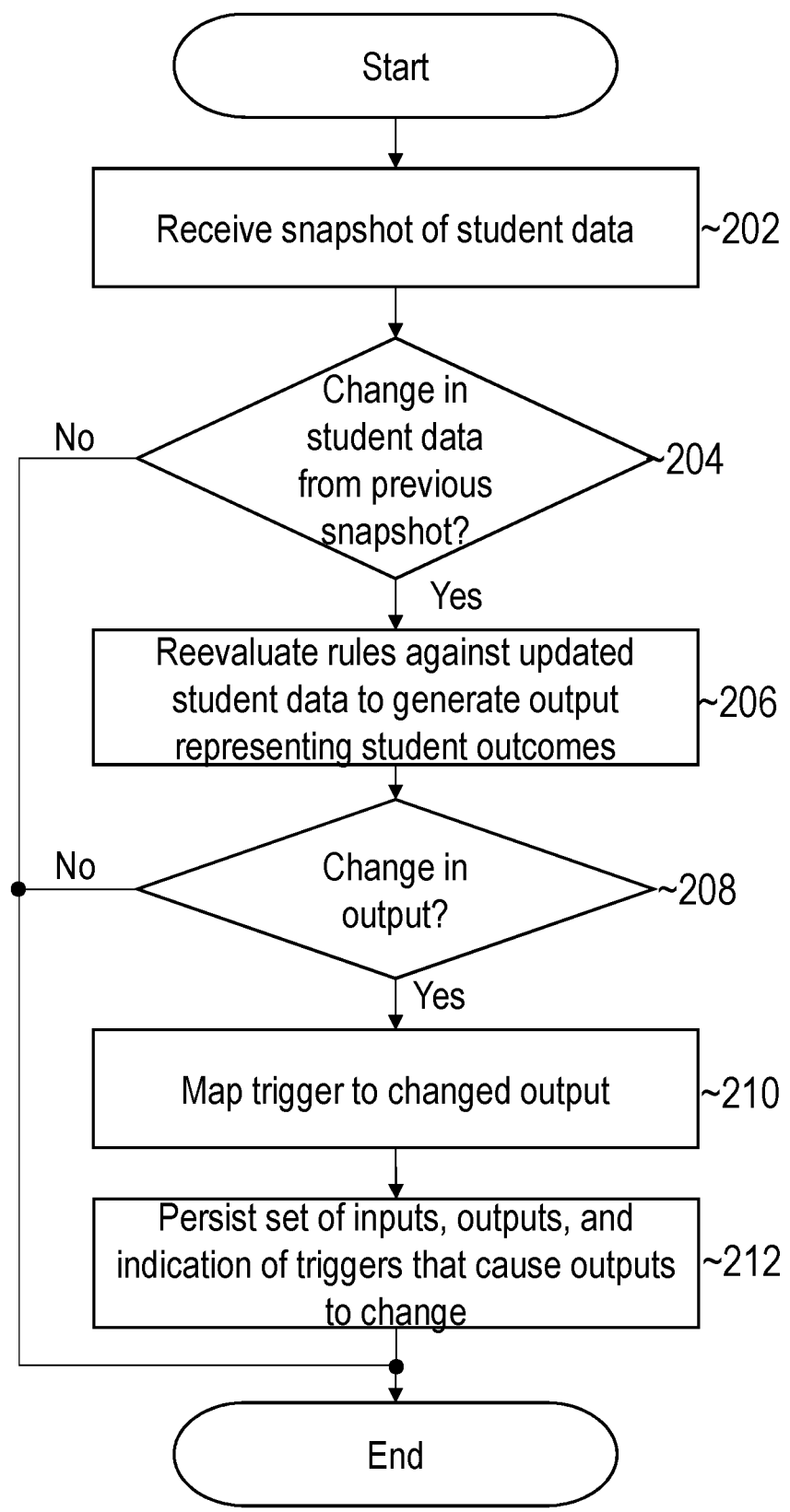
FIG. 2 illustrates an example set of operations for providing contextual guidance on student outcome changes in accordance with some embodiments.

FIG. 2 illustrates an example set of operations for providing contextual guidance on student outcome changes, in accordance with some embodiments. One or more of the steps may be omitted, repeated, and/or performed in a different order. Accordingly, the specific arrangement of steps shown in FIG. 2 should not be construed as limiting the scope of the embodiments.

The set of operations includes receiving a snapshot of student data (operation 202). For example, system 100 may receive a new REST-based message, such as a SAFI message as previously described, which includes several attributes representing the current state of a student. As another example, student retention system 100 may receive an ISIR and/or other records from an external system, such as the CPS.

A snapshot of student data may include up-to-date academic data 102, personal data 104, institutional data 106, financial data 108, or some combination thereof. For example, a snapshot may identify the current course schedule, GPA, residence, and financial aid history for a student, among other attributes. A REST-based message may include a set of data fields that follow a protocol, where each data field gives a current value for a corresponding student attribute.

Once the snapshot of student data has been received, the set of operations includes determining whether there was a change in student data from a previous snapshot (operation 204). System 100 may compare the newly received snapshot to a previously received snapshot to determine whether any of the values have changed. For example, the data fields in one REST-based message may be compared to corresponding data fields in a previously received REST-based message to determine whether values for any of the student attributes changed.

In some embodiments, operation 204 comprises searching for changes to a subset student attributes in a student snapshot. For example, system 100 may be configured to search for changes to student attributes that serve as inputs to one or more rules in rule repository 114. Inputs that do not serve as inputs may be ignored to reduce the processing overhead of comparing snapshots and reevaluating rules. Attribute inputs may be specified in the rule definitions. System 100 may parse the rule definitions to determine which student attributes to analyze.

If a change is detected, then the set of operations includes reevaluating rules against the updated student data to generate a set of outputs representing student outcomes (operation 206). In some embodiments, the set of outputs identifies student resources that are available to a student. For example, varying resources may be available to the student depending on the current student's status, such as whether the student is current full-time or part-time, the student's GPA, etc. If there is a change in the student's status, then the resources that are available to the student may also change. This information/output may be linked directly to a student record which may be used to access the resources. For instance, if additional resources become available to the student, then the record may be automatically updated without any direct intervention by a human administrator. On the other hand, if a student loses access to one or more resources, then the record may be automatically updated to reflect that the student is ineligible to receive those resources.

In some embodiments, the set of outputs include outcomes related to financial aid packaging. For example, a set of rules may be applied to determine financial aid eligibility for grants, scholarships, private, and/or public student loans. Automated packaging engine 112 may apply the set of rules to determine whether additional financial aid packages have become available and/or unavailable in response to changes during the student lifecycle. Automated packaging engine 112 may also apply rules to determine which financial aid packages would be most optimal for a student. A financial aid package may be more optimal than another when the funding options lead to less overall student debt while allowing for the student's institutional costs to be covered.

In some embodiments, a set of rules may be applied to ensure the student financial aid packages are in compliance with a set of regulations. Noncompliance may result in institutional liabilities for each student violation. Automated packaging engine 112 may reduce or eliminate compliance risk by applying up-to-date compliance checks on a real-time basis as student data is updated. Automated packaging engine 112 may also automatically compute disbursements dates and select the source of funding for students to ensure compliance with the set of compliance rules. A change in student data may result in a change in the disbursement date, the source of a disbursement, and/or the amount of a disbursement.

Additionally or alternatively, automated packaging engine 112 may generate outputs representing other student outcomes, such as outcomes related to programs in which the student is enrolled, an estimated cost of attendance, outcomes related to major requirements, etc. For example, a rule may be defined to place a student on academic probation if the student does not satisfy a minimum set of requirements. Automated packaging engine 112 may apply the rule based on the current snapshot to generate an output indicating whether the student is currently on academic probation.

In some embodiments, rule repository 114 includes cascading rules where the output of one rule serves as the input for another rule. For example, a top-level rule in a cascade may be defined that receives a student's current credit hours for a semester as input and outputs a result indicating whether a student is full-time or part-time. Another rule for evaluating available resources may receive the output of the top-level rule as input. The rule may output which resources are available based in part on whether the student is enrolled on a full-time or part-time basis. As another example, automated packaging engine 112 may evaluate a rule for computing a total-to-date value for financial aid consumed by a student based on a set of financial historical data input into the system. The output for this rule may be input to another rule for determining disbursement dates for a financial aid package. Automated packaging engine 112 may evaluate this rule and adjust the disbursement dates, if warranted by the data included in the up-to-date student snapshot.

Referring again to FIG. 2, the set of operations further includes determining whether there was a change in the output (operation 208). Automated packaging engine 112 may compare one or more of the example outputs previously described to one or more corresponding outputs generated by automated packaging engine 112 based on an input data set from a previous student snapshot. For example, automated packaging engine 112 may compare disbursement dates, disbursement amounts, and disbursement sources to determine whether there are any changes to a student's financial aid package. As another example, automated packaging engine 112 may compare outputs identifying available student resources to determine whether there was any change between the two most recent student snapshots.

If a change is detected, then a set of one or more triggers are mapped to the changed output (operation 210). Automated packaging engine 112 may identify a trigger by determining which input value or values caused an output value to change. For example, for each output value that has changed, automated packaging engine 112 may parse the rule definition to determine the set of inputs during the evaluation phase. Automated packaging engine 112 may then compare the set of input values to the input values of the previous snapshot to determine which values changed. Automated packaging engine 112 may flag the values that change as triggers the caused a change in the student outcome represented by the updated output value.

In other cases, a trigger may be a newly received set of student data that was not previously received. For example, the system may initially receive a set of SAFI messages, and determine a set of student outcomes based on the student attributes included therein. The system may subsequently receive an ISIR record from the CPS that includes new FAFSA data for a student that was not contained in any of the SAFI messages. The new data may serve as a trigger that results in a change in one or more student outcomes.

The set of operations further includes persisting the set of inputs, outputs, and an indication of the triggers that caused the outputs to change (operation 212). Persisting this data over a student lifecycle results in an audit trail that tracks when changes in student outcomes occur and what caused the changes to occur. This information may be used to provide insight to students and advisers to track a student's academic career and the events that triggered changes a student's trajectory. This information may further be used to train machine learning models, generate interactive interfaces, provide alerts, diagnose behavior leading to suboptimal outcomes, recommend actions to optimize student outcomes, and/or trigger automated actions to optimize student outcomes, as discussed further in the sections below.

4. Supervised and Unsupervised Learning of Patterns Leading to Optimal Outcomes In some embodiments, machine learning analytic 130 is configured to train a set of machine learning models using the persisted set of inputs and outputs from automated packaging engine 112. The persisted data may be used to train one or more of the following: (a) binary classification models; (b) multiclass classification models; and (c) regression models. Once trained, the machine learning models may capture a variety of patterns that lead to optimal and sub-optimal student outcomes.

Binary and multiclass classification models may be trained in a supervised or unsupervised manner to predict student outcomes based on a set of student inputs. Binary classification models may be trained for student outcomes that are binary in nature (e.g., outcomes that are positive or negative). For example, a binary classification model may be trained to predict whether a student will be awarded a particular grant, loan, and/or other financial aid application based on a current snapshot of the student. As another example, a binary classification model may be trained to predict whether a student will be accepted into a particular program (e.g., a major) based on the current academic profile of the student. Example binary classification models may include, but are not limited to, decision trees, random forests, Bayesian networks, support vector machines (SVMs), and one-neuron neural networks.

Multiclass classification models may be trained to predict more complex student outcomes than binary classification models. For example, a multiclass classification model may account for complex relationships between funds in a financial aid package to identify the combinations of funding options that are predicted to be the most optimal for a student. One or more of the binary classification models, listed above, may be configured and/or combined to provide a multiclass classification model. For example, an artificial neural network may be configured to have several binary neuron outputs. The output of one neuron may serve as input to one or more other neurons. This approach allows for complex modelling that capture dependencies and other relationships between different nodes. For instance, the acceptance of one funding option may affect the eligibility of another option.

Regression models may be trained to make predictions based on numeric values. For example, a regression model may be trained to predict the amount of funds a student will receive based on a current snapshot of a student. As another example, a regression model may predict disbursement dates, debt burden, GPA, and/or other numeric values reflecting a particular student outcome.

In some embodiments, the training process comprises clustering students together that have similar profiles. For instance, clusters may be formed based on demographic information (e.g., age, gender, etc.), academic information (e.g., GPA, declared major, etc.), financial information (e.g., loan history, parent's income, etc.). Clustering allows for more compute-efficient analysis of student outcomes by restricting comparisons to students that share similar/relevant attributes.

Figure 3:
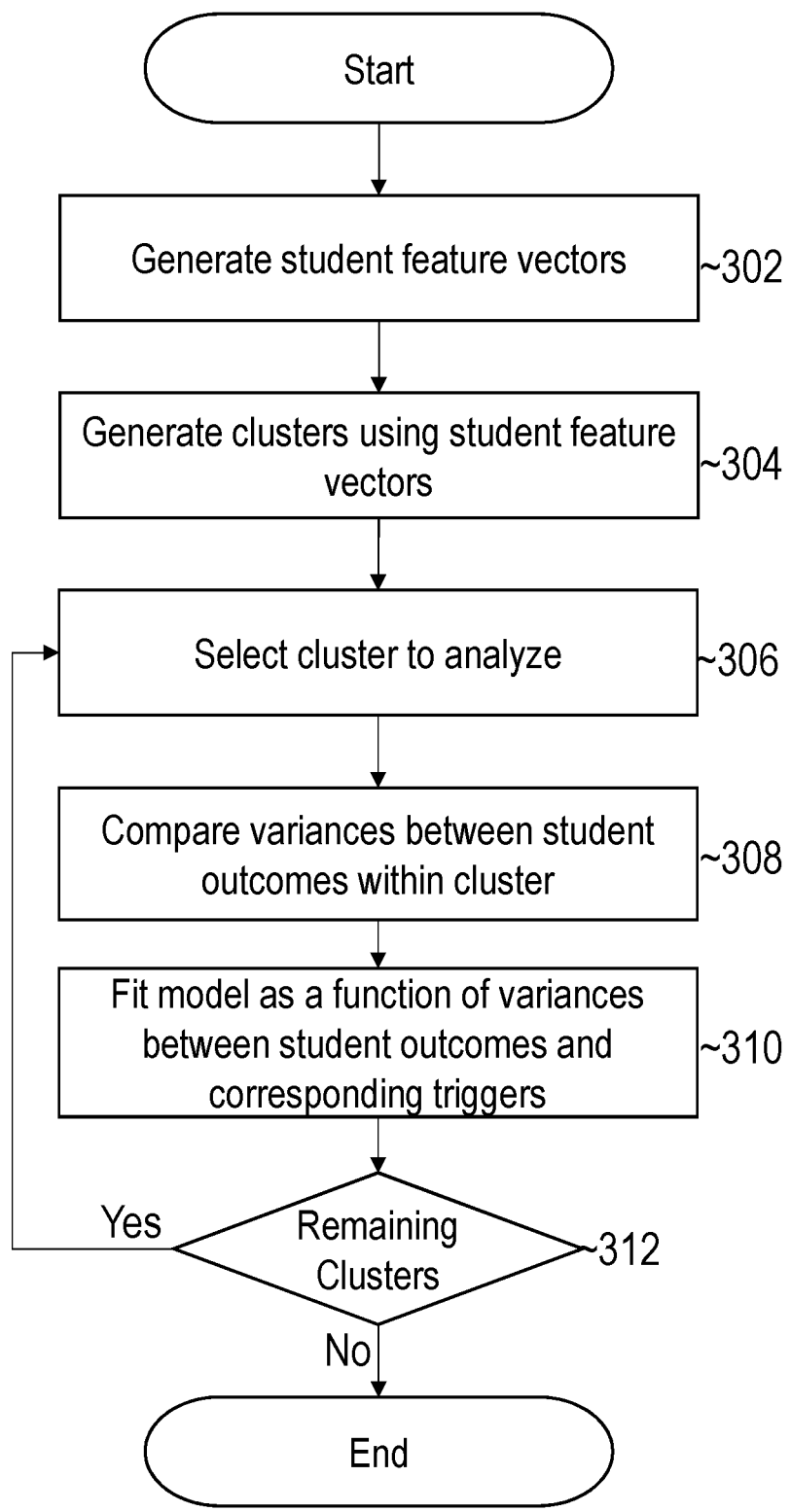
FIG. 3 illustrates an example set of operations for training a set of models to learn patterns leading to optimal outcomes in accordance with some embodiments.

FIG. 3 illustrates an example set of operations for training a set of models to learn patterns leading to optimal outcomes in accordance with some embodiments. One or more of the steps may be omitted, repeated, and/or performed in a different order. Accordingly, the specific arrangement of steps shown in FIG. 3 should not be construed as limiting the scope of the embodiments.

The set of operations includes identifying a set of student feature vectors (operation 302). A feature vector for a student is a set of ordered values formed from attributes of a student. The values in a feature vector may include any combination of student attributes previously described, such as demographic information, academic information, and/or financial information. In some embodiments, multiple feature vectors may be formed for a given student to cluster students using different feature combinations. For example, students may be clustered across different demographic profiles using different combinations of demographic information. Additionally or alternatively, students may be clustered across other combinations of features. This approach allows for different types of similarity to be analyzed independently.

Training engine 122 next generates clusters of students as a function of the student feature vectors (operation 304). In some embodiments, training engine 122 may generate the clusters using k-means clustering. According to this approach, the clustering process is initialized by choosing k centroids, which may be the feature vectors of k randomly chosen items or the centroid of a randomly generated partition of items. The approach next assigns (or reassigns) each item to a cluster whose mean has the least squared Euclidean distance from the respective feature vector. After the assignment/reassignment step, the approach calculates the new means for the clusters. The assignment and centroid update steps are repeated until the assignments no longer change. The result is a partition of n student feature vectors into k clusters based on student similarity.

Additionally or alternatively, other clustering processes may also be implemented at operation 304. Examples include, but are not limited to k-modes clustering, spectral clustering, and tri-point arbitration-based clustering methods. Techniques for clustering based on tri-point arbitration are described further in U.S. application Ser. No. 15/140, 358, now U.S. Pat. No. 10,073,906, titled "SCALABLE TRI-POINT ARBITRATION AND CLUSTERING", which is hereby incorporated by reference as if set forth in its entirety.

Once the clusters have been generated, training engine 122 selects a cluster to analyze (operation 306). As previously mentioned, each cluster may group a set of students that share similar profiles. Training engine may independently analyze each cluster to determine which students in the cluster have the optimal student outcomes and the behavior/triggers that lead to the optimal outcome. Training engine 122 may select the clusters in any order or the clusters may be processed in parallel.

For the selected cluster, training engine 122 compares the variances in student outcomes (operation 308). For example, training engine 122 may compare differences in financial aid packages, debt burdens, disbursement dates, graduation dates, and/or other student outcomes. Training engine 122 may identify student outcomes and the triggers that caused the outcomes from the audit-trail maintained for students in the selected cluster.

Training engine 122 next fits a model to the student data as a function of the variances in student outcomes (operation 310). For example, one or more classification models, regression models, neural networking models may be fit to the data. The model may capture the triggers/student behavior that leads to particular student outcomes.

In some embodiments, optimal outcomes may be labelled, such as by an adviser or administrator, to inject specific domain knowledge into the learning process. In other cases, an optimal outcome may be identified automatically based on a set of rules and/or criteria. For example, a rule may define an optimal outcome as the student in the group with the lowest accumulated debt. As another example, a rule may define an optimal outcome as the student with the highest financial aid to debt ratio. The outcomes that are classified as "optimal" may vary from implementation to implementation.

In some embodiments, training engine 122 trains a model based on the triggers that lead to optimal and/or sub-optimal student outcomes. For example, a random forest may be trained to capture triggers leading to different funding outcomes. In this example, a decision tree may be formed that identifies a sequence of actions and/or other triggers leading to optimal and/or sub-optimal funding outcomes. Example triggers may include applying for a particular source of funds, what the balance/ration of funds received is (e.g., grants, private loans, public loans, scholarships, etc.), when the funds are distributed, the amount of funds distributed, and the student's GPA. The decision tree may be evaluated to identify what triggers have led to the most optimal funding outcomes (e.g., the lowest debt) to promote effective and responsible funding.

Training engine 122 next determines whether there are any remain clusters to analyze (operation 312). If so, then training engine 122 may repeat operations 306 to 310 for a newly selected cluster. Otherwise, the training process may end.

In some embodiments, training engine 122 periodically or continually tunes machine-learning models using a set of test data. The test dataset may comprise observed examples of student actions and outcomes that were not used to initially train a machine learning model. Training engine 122 may then estimate outcomes for the students in the test dataset using two or more candidate machine learning models trained using different model parameters. The estimated outcomes may then be compared to the observed outcomes to determine an estimation error for the model. The candidate model yielding the lowest estimation error may then be used to generate predictions for future examples where the student outcomes are not yet known.

The parameters that are varied during model tuning may vary from implementation to implementation. In some embodiments, the number of student clusters may be varied. For example, a predefined range of values for k may be used between a minimum threshold value and a maximum threshold value according to a predetermined interval. Models may then be trained from the different groupings of students. The value for k that yields the lowest estimation error may then be used to generate predictions for future cases.

Additionally or alternatively, the feature attributes used for clustering students and/or training models may be varied. Varying the feature attributes may include adjusting the number of features in the feature vectors. For example, a minimum and maximum threshold of feature values may be set, similar to described above for the value of k. Additionally or alternatively, for a given number of features, different combinations of features attributes may be used. For example, given a feature vector of size 2 and the feature attributes age, GPA, major, the following feature vectors may be formed: [age, GPA], [age, major], and [GPA, major]. If the size is incremented to 3, then the feature vector may include [age, GPA, major]. The features may be selected arbitrarily, according to predefined heuristics, or may be curated by a domain expert.

Additionally or alternatively, the tuning process may train different types of models. For example, the training process may train an artificial neural network, an SVM, and a random forest. For a given type of model, the tuning process may train multiple candidates using varying parameters. For example, the tuning process may vary the number of neurons and/or connections in an artificial neural network. In other examples, the model may vary the number of hyperplanes in an SVM or the number of nodes in a random forest. The tuning process may determine the estimation error by comparing the difference between the estimated outcome and the observed outcome. The total estimation error for a candidate may be computed as a function of the magnitude of the difference and/or the number of examples for which the outcomes were wrongly predicted. The tuning process may then select the candidate with the lowest estimation error.

5. Real-Time Model Evaluation and Interface Presentation

In some embodiments, interface manager 140 presents actionable items to a student and/or adviser based on outputs received from machine learning analytic 130. For example, machine learning analytic 130 may evaluate trained models to build recommendations of additional funding that a student is likely to be eligible for but may not yet be aware. Interface manager 140 may present interface elements (e.g., links, forms, etc.) that allow the user to apply for the financial aid. As another example, machine learning analytic 130 may provide access (e.g., through hyperlinks and/or other interface elements) to resources that have helped students with similar profiles achieve successful outcomes.

Figure 4:
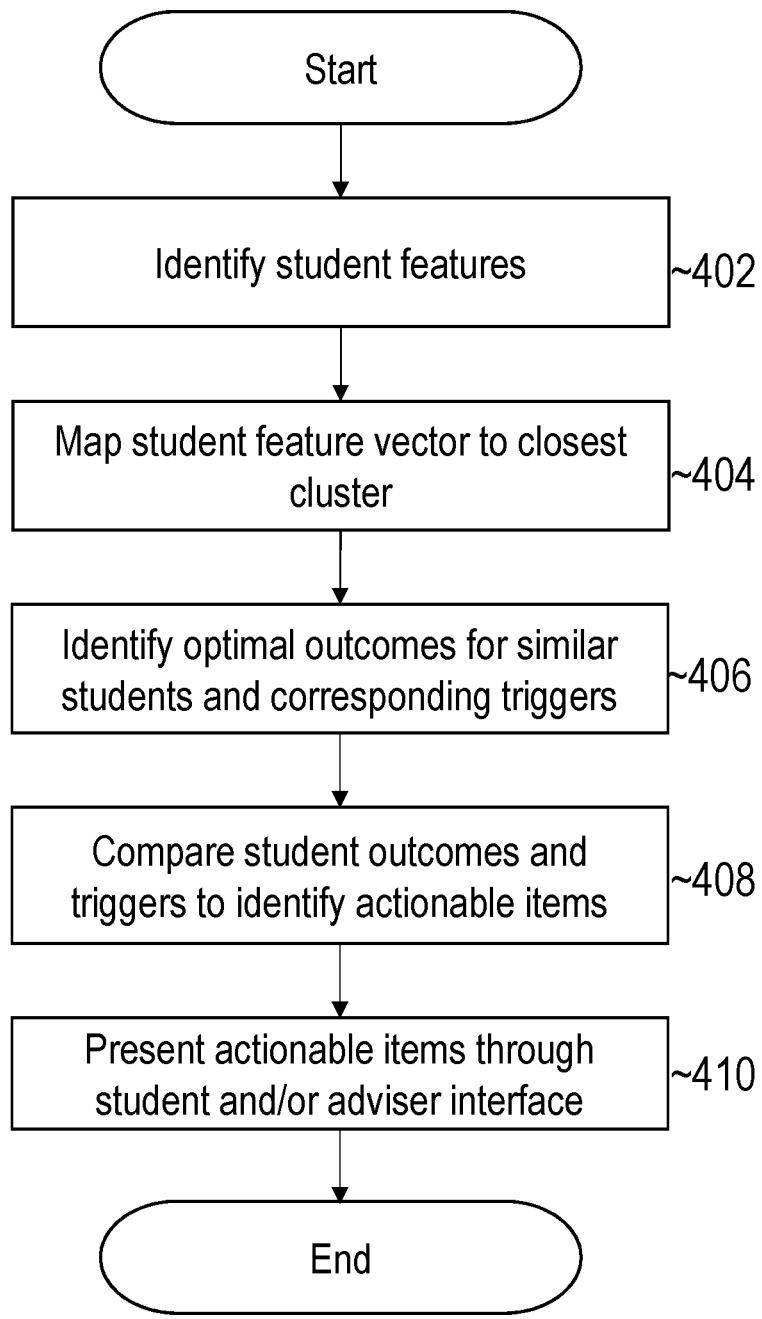
FIG. 4 illustrates an example set of operations for evaluating a machine learning model to provide guidance to a student in accordance with some embodiments.

FIG. 4 illustrates an example set of operations for evaluating a machine learning model to provide guidance to a student in accordance with some embodiments. One or more of the steps may be omitted, repeated, and/or performed in a different order. Accordingly, the specific arrangement of steps shown in FIG. 4 should not be construed as limiting the scope of the embodiments.

The set of operations include generating a student feature vector for a student for which the evaluation process is being performed (operation 402). As previously indicated, a feature vector for a student is a set of ordered values formed from attributes of a student. The values in a feature vector may include any combination of student attributes, such as demographic information, academic information, and/or financial information.

Evaluation engine 124 maps the student feature vector to the closest cluster in a set of clusters generated during the training phase (operation 404). The closest cluster may be identified as the cluster with the centroid having the smallest weighted or unweighted Euclidean distance from the feature vector.

Evaluation engine 124 next identifies the optimal outcomes for similar students belonging to the cluster and the corresponding triggers based on the trained model (operation 406). For example, evaluation engine 124 may analyze a decision tree to identify what triggers were most predictive of having an adequate amount of funding with minimal debt to cover educational expenses. Additionally or alternatively, other optimal outcomes and corresponding triggers may be determined by evaluating patterns captured by other classification, regression, and/or neural network machine learning models.

Evaluation engine 124 further compares the student outcomes and triggers with the optimal outcome/triggers for similar students in the cluster to identify actionable items to optimize the student's academic/financial plan (operation 408). For example, evaluation engine 124 may compare the current student financial aid package with those leading to optimal outcomes. Based on the comparison, evaluation engine 124 may identify adjustments to the current financial aid package that the student may make to achieve a more optimal funding solution. For example, evaluation engine 124 may identify financial aid sources and/or amounts that other similar students have used to reach an optimal funding solution. As another example, evaluation engine 124 may identify a disbursement schedule for funds that helped students achieve optimal outcomes. Evaluation engine 124 may output a set of evaluation results identifying recommended actionable items and the predicted student outcomes based on the learned patterns from similar students.

In some embodiments, presentation engine 136 presents the actionable items through student and/or adviser interface (operation 410). For example, presentation engine 136 may generate a display including the message "93% of students with greater than a 3.8 GPA in an engineering major with your background qualify for Scholarship Y—Please select link to apply". Presentation engine 136 may further include a hyperlink to initiate the application process. As another example, the student interface may generate a display "Your schedule course load dropped below 12.0 credit hours resulting in a reduction in available financial aid and student resources. Please select this link to add more courses to your schedule to reverse this change." Additionally or alternatively, presentation engine 136 may generate other interface elements that allow a user to view and/or perform recommended actions to achieve optimal outcomes.

Figure 5A:
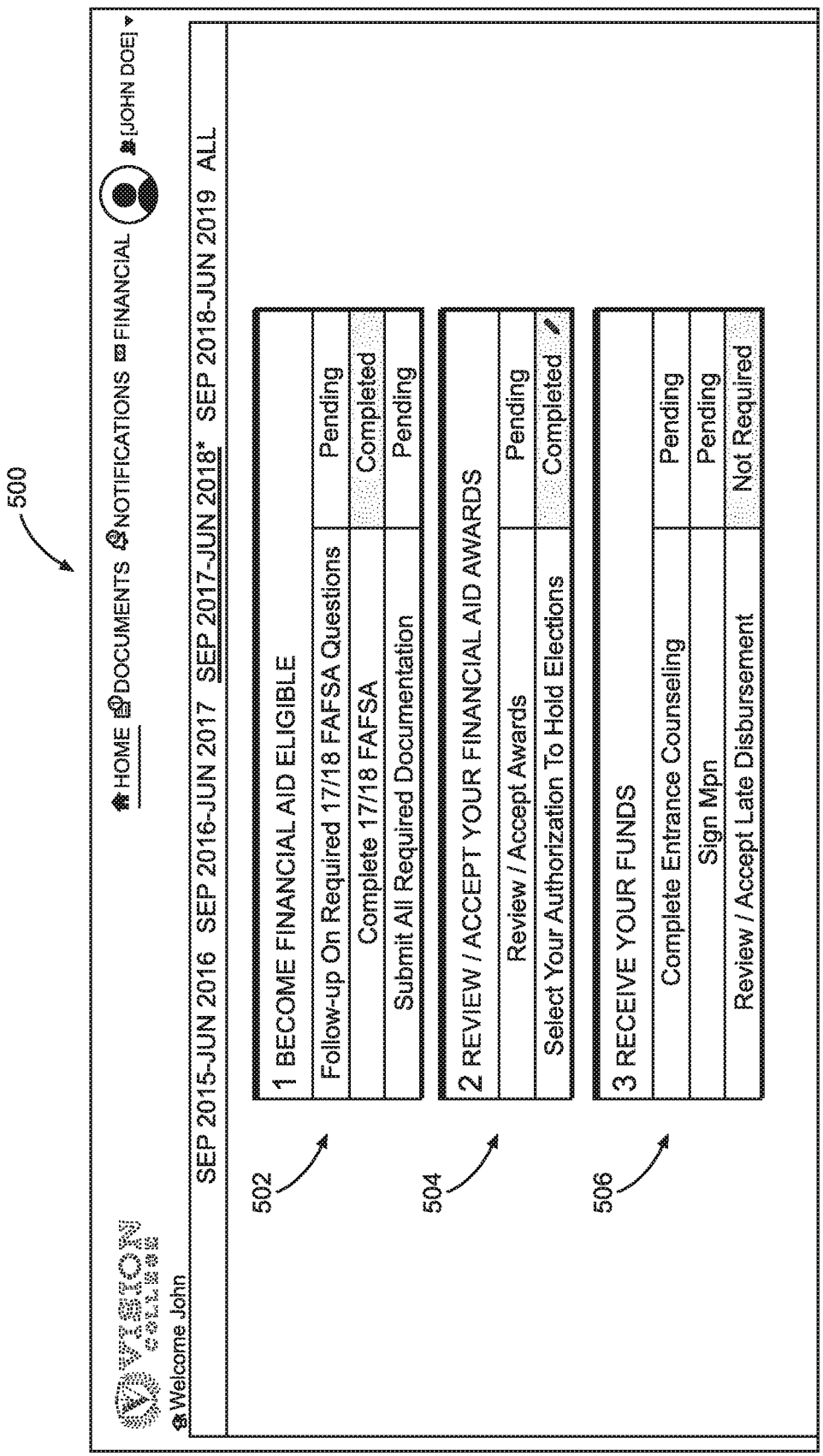

FIGS. 5A-J illustrate example interfaces for providing contextual guidance to students in order to achieve optimal student funding in accordance with some embodiments. FIG. 5A illustrates screenshot 500, which displays an interface facilitating a student's access and optimization of a financial aid package. The interface includes interface elements 502, 504, and 506. Interface element 502 includes a set of links for becoming eligible for financial aid, such as following up on FAFSA questions, completing FAFSA forms, and submitting other documentation. The status of each action item is displayed (e.g., pending, completed, not required). Interface element 504 includes a set of links for reviewing and accepting financial aid awards, and interface element 506 includes a set of links for receiving awarded funds.

FIG. 5B illustrates screenshot 508, which displays an interface for reviewing a current financial aid summary and adjusting funding. Interface element 510 displays a summary of an estimated cost of attendance, which is based on the estimated tuition, fees, living expenses, and other expenses for attending an educational institution. Interface element 512 displays financial aid for which the student is eligible, including financial aid that has already been accepted and financial aid that has not yet been accepted. Interface element 512 may further provide recommendations on what financial aid to accept and sources of financial aid that the student is likely eligible for but may not be aware. Interface element 512 may include links such as link 514, which allows a user to update the acceptance on eligible financial aid. Interface element 516 presents a comparison of estimated cost of attendance versus the current funding. In this example, the student is underfunded by $3,080.00. Interface element 518 allows a user to adjust funding to cover the shortfall. Interface element 518 may further provide recommendations on additional funding sources based on students with similar profiles.

Figure 5C:
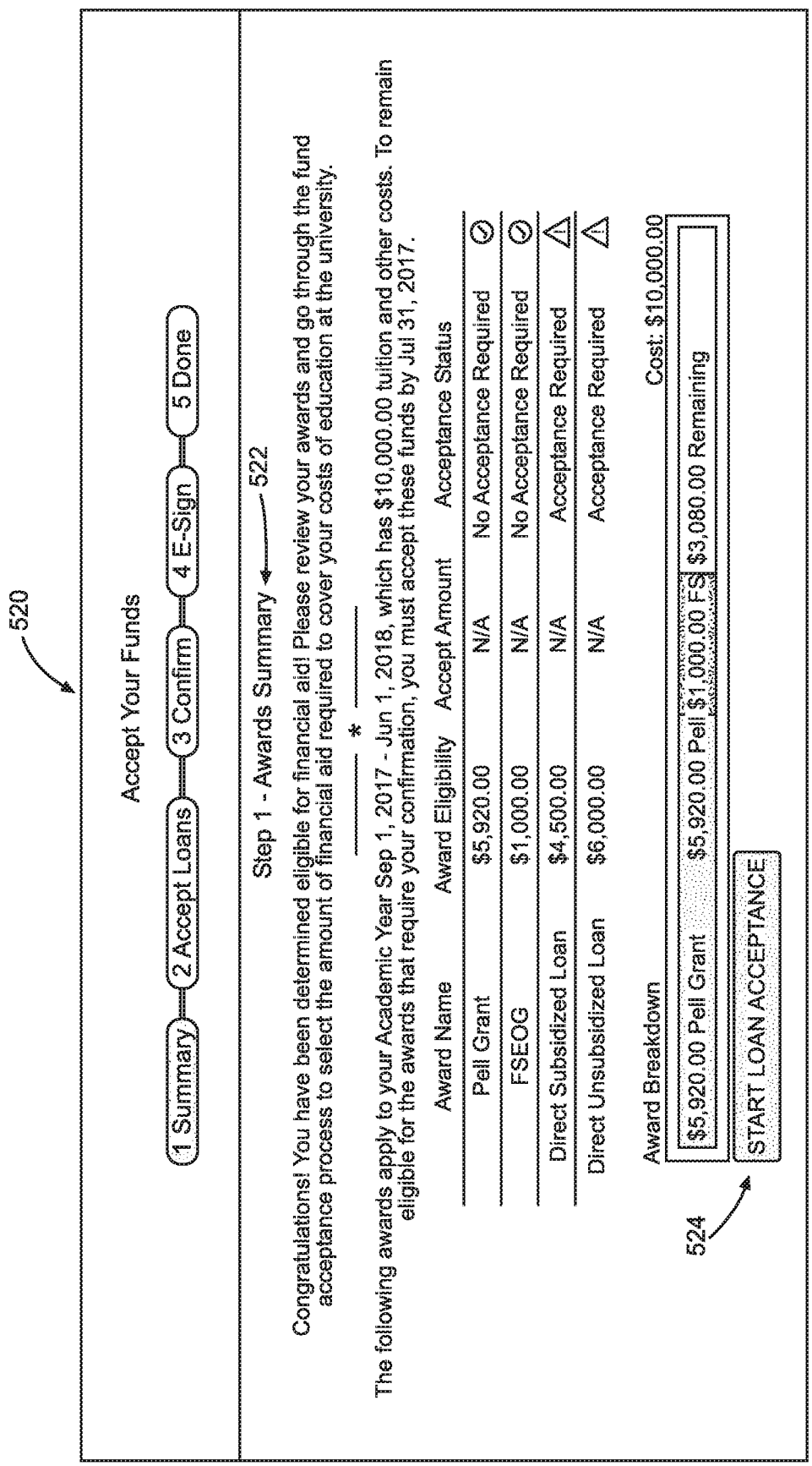

FIG. 5C illustrates screenshot 510, which displays an interface for accepting funds. The interface may be displayed in response to a user selecting the "Adjust my Funding" link from interface element 518. Interface element 522 presents an awards summary for the selected financial aid. Interface element 524 is a button or link that allows the user to start the loan acceptance process.

Figure 5D:
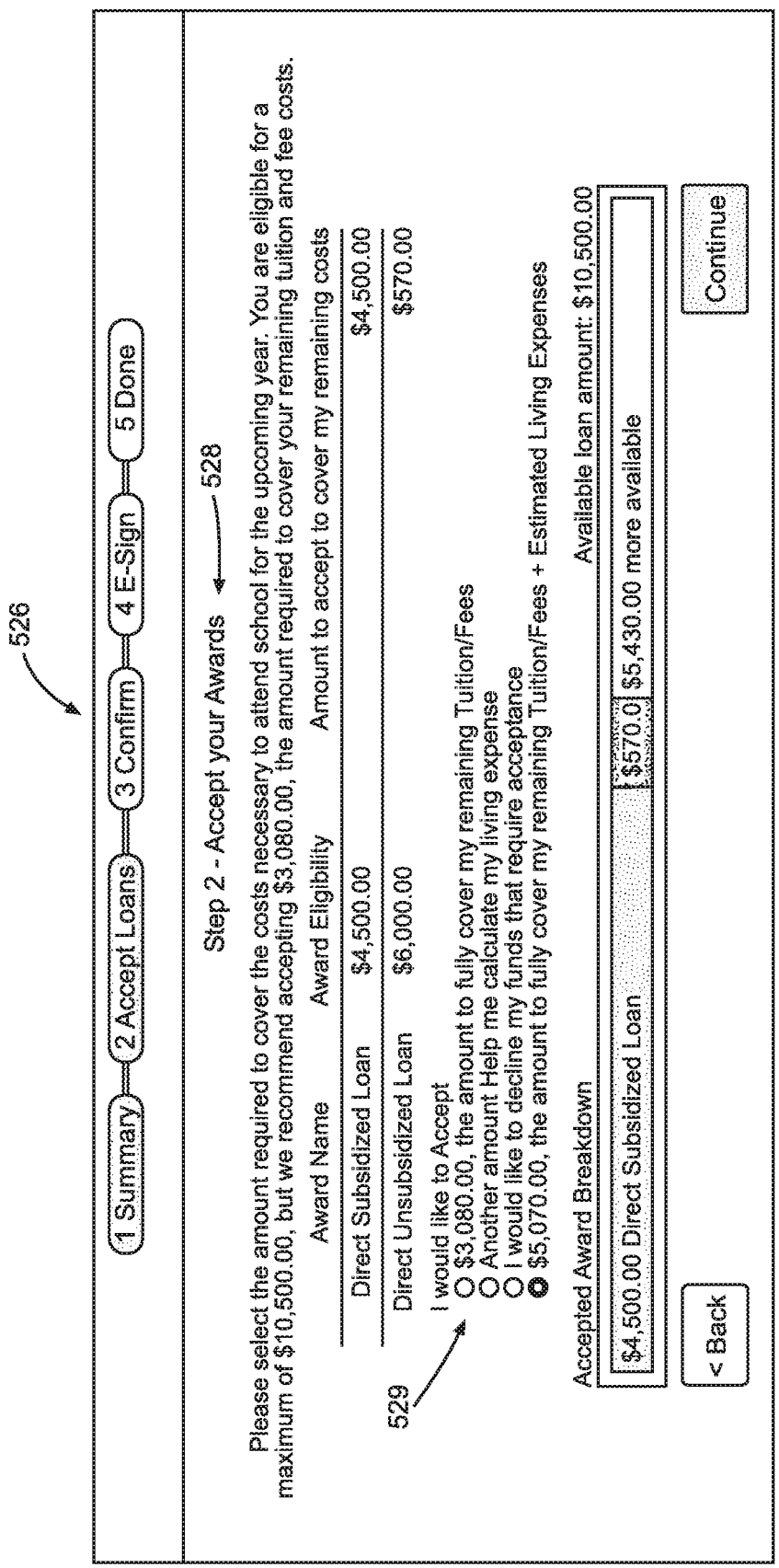

FIG. 5D illustrates screenshot 526, which displays an interface for accepting awards. Interface element 528 presents the award eligibility and a recommended amount to accept to cover remaining costs of tuition. Interface element 529 allows the user to adjust and select how much financial aid to accept.

FIG. 5E illustrates screenshot 530, which displays an interface for adjusting the amount of financial aid to accept. The interface may be displayed responsive to a user selecting "Help me calculate my living expenses". In response, the user is presented with interface element 532, which allows the user to make adjustments to the estimated living expenses for the year.

Figure 5F:
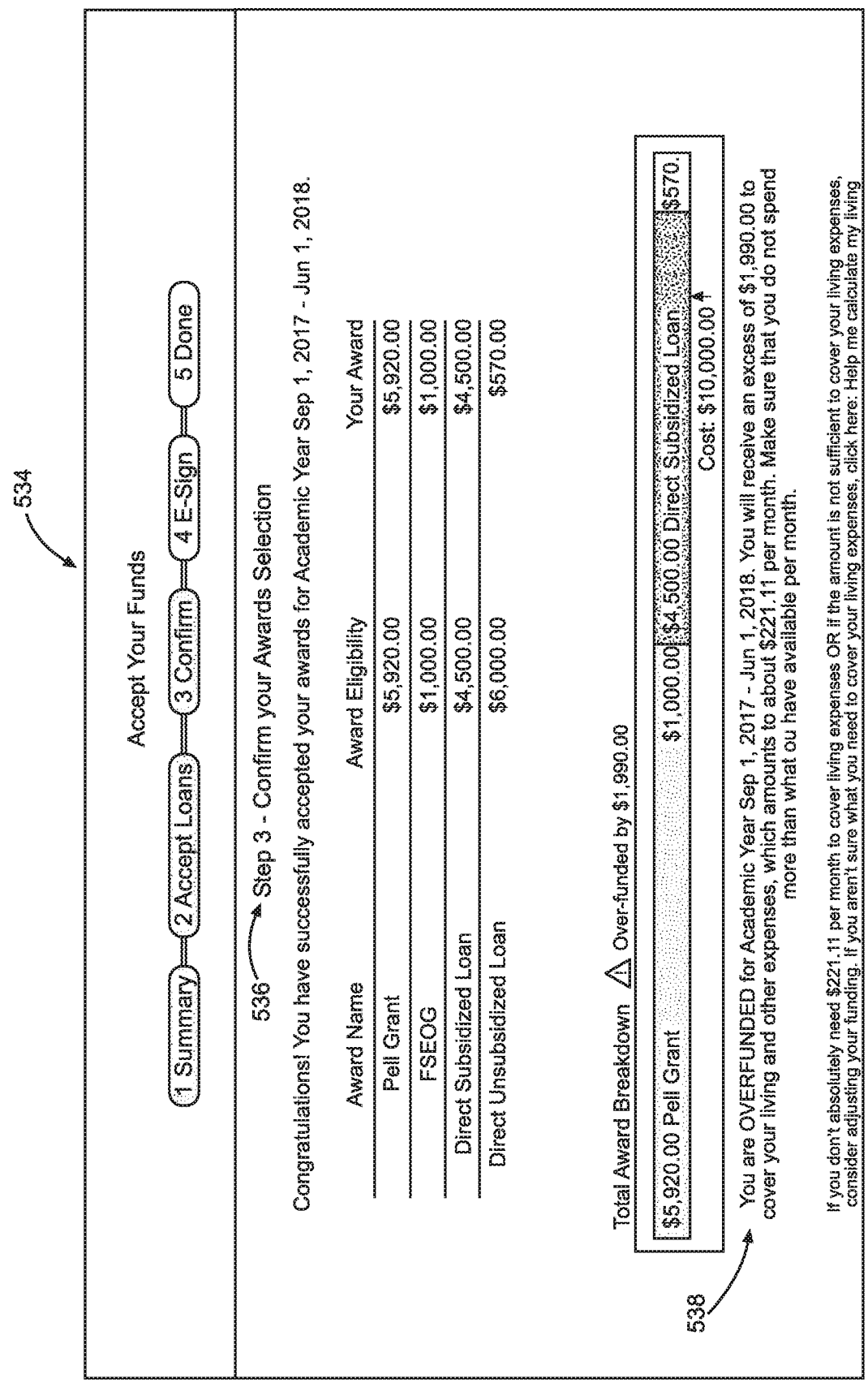

FIG. 5F illustrates screenshot 534, which displays an interface for accepting funds. Interface element 536 allows a user to review and confirm the awards selections. Interface element 538 presents a summary of the accepted awards versus the estimated cost of attendance. In the present example, the student went from being underfunded to overfunded. A recommendation to reduce the amount awarded funds accepted is also provided to encourage responsible borrowing.

Figure 5G:
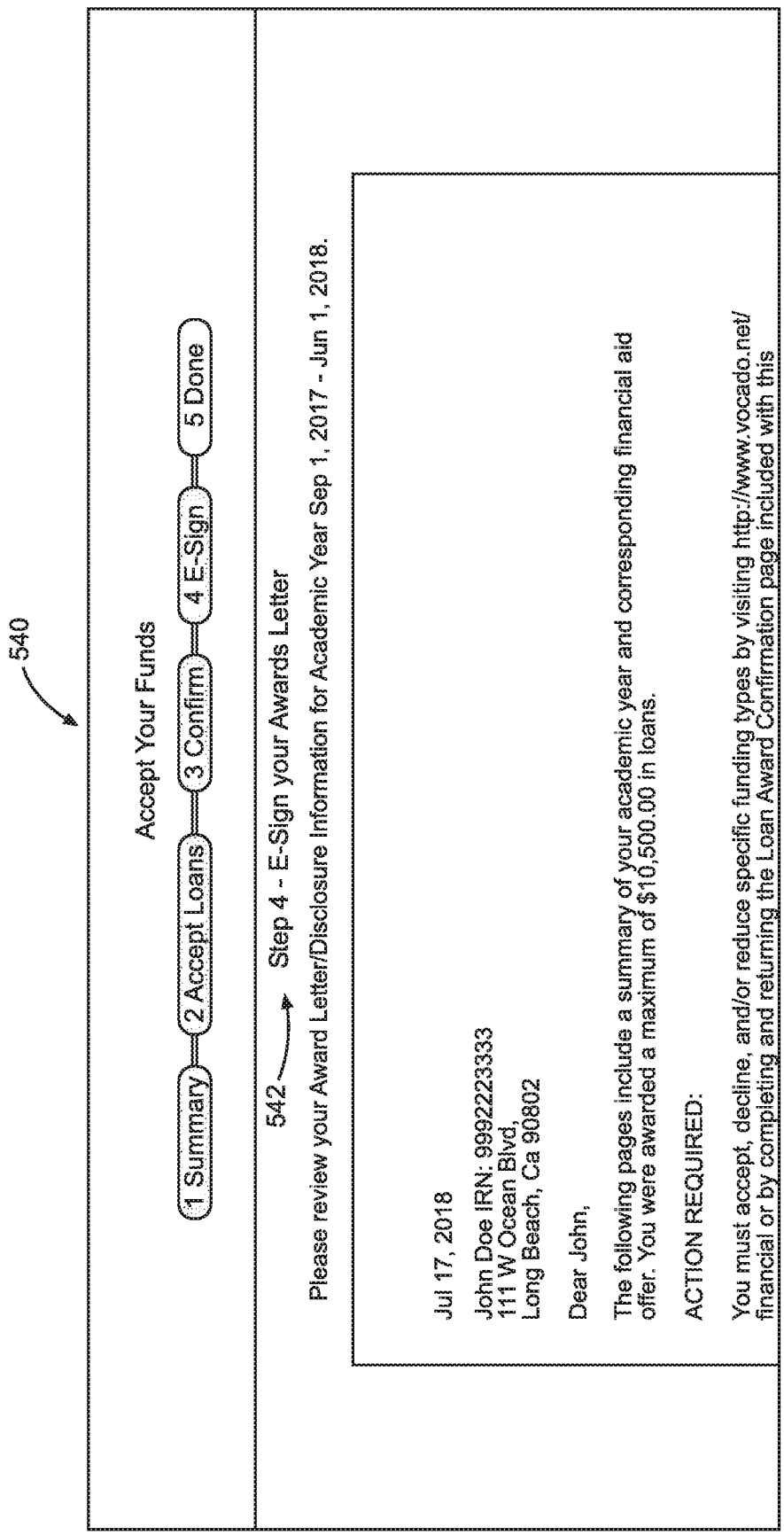

FIG. 5G illustrates screenshot 540, which displays an interface for electronically signing a document. Interface element 542 presents an award letter and disclosure information for the academic year to a student. The student may review the letter and e-sign to proceed with finalizing the financial aid package.

Figure 5H:
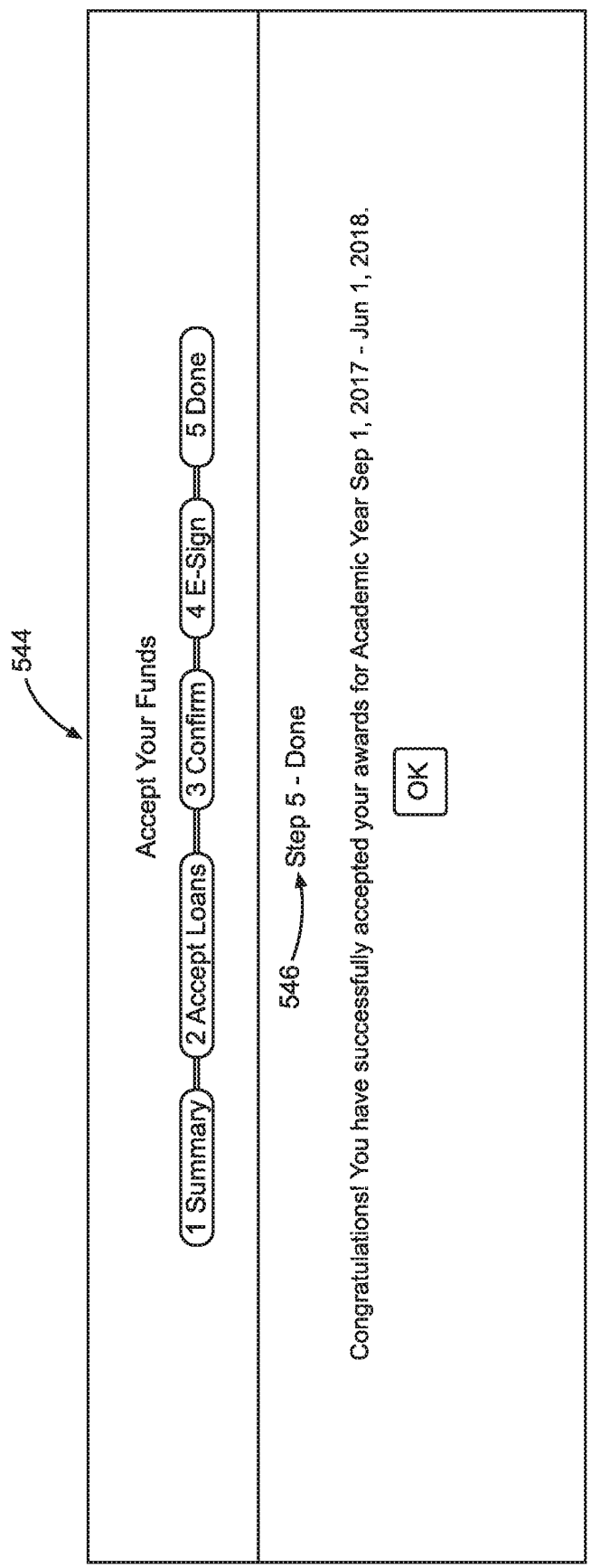

FIG. 5H illustrates screenshot 544, which displays an interface for accepting a financial aid package. Interface element 546 may be presented in response to a student electronically signing the award letter and formally accepting the funds.

FIG. 5I illustrates screenshot 548, which displays an updated set of financial aid information based on the student's acceptance of additional financial aid. As can be seen interface elements 512 and 514 have been updated to reflect the newly accepted loans. Interface elements 516 and 518 have also been updated to indicated that the student is now overfunded for the academic year.

FIG. 5J illustrates screenshot 550, which displays an interface for viewing scheduled disbursements based on the currently accepted funds. Interface elements 552 presents the award name, the scheduled disbursement date and the amount for future and received disbursements.

Machine learning analytic 130 may be integrated with presentation engine 136 to present real-time recommendations to students accessing interfaces such as those depicted in FIGS. 5A-5J. These recommendations may provide insights on optimal funding sources and amounts as a student navigates the complex financial aid process. Further, the recommendations may identify optimal sources of funding of which a student is not aware that has been learned from the behavior of students with similar profiles.

Additionally or alternatively, the interface may provide other types of recommendations. For example, an interface may include a recommendation to register for a particular class predicted to optimize a student outcome and provide a registration link for the class. As another example, the interface may include a recommendation for a tutoring service that has helped similar students and a link to the service's website. Thus, the recommendations and interfaces that are generated may vary from implementation to implementation.

6. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
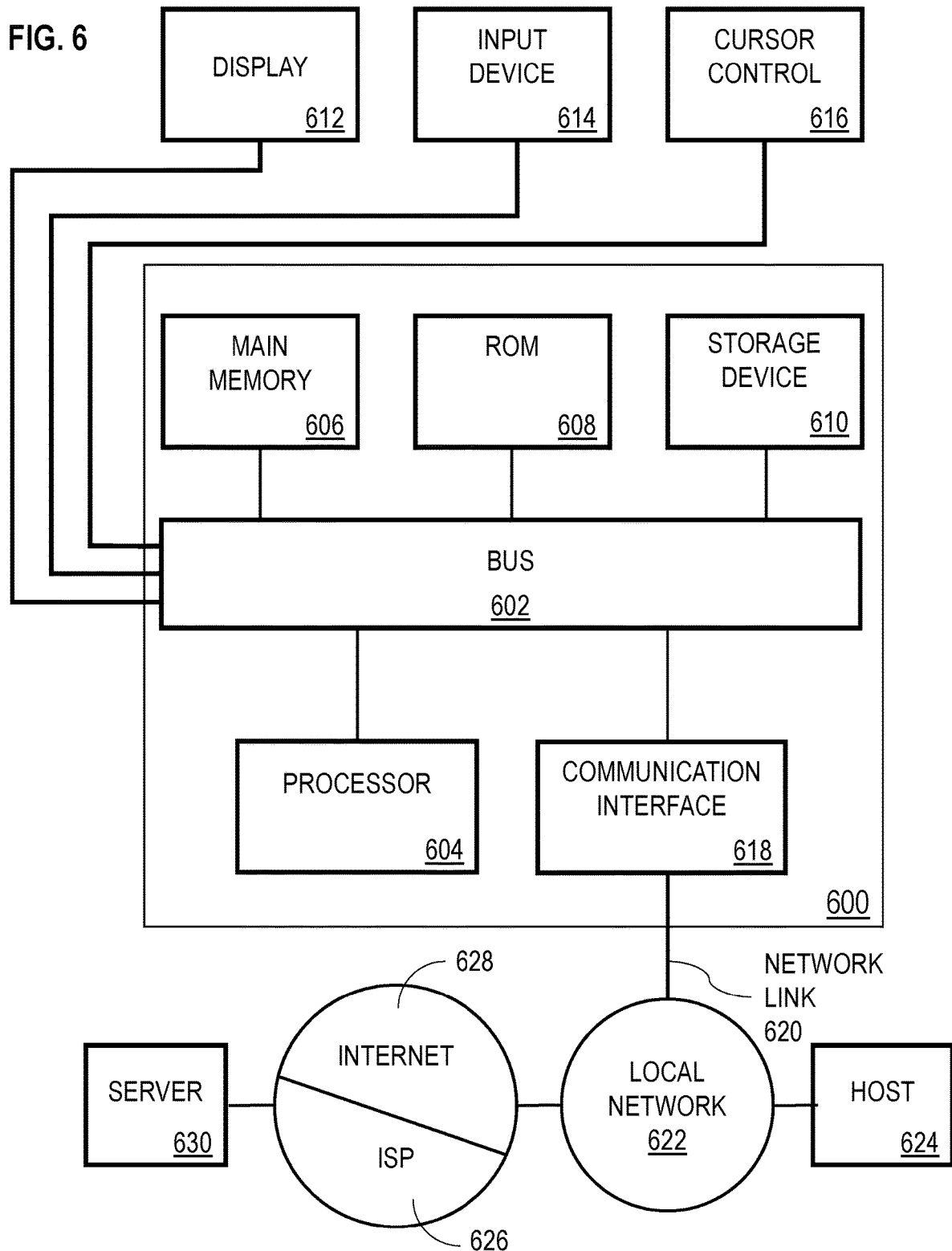
FIG. 6 shows a block diagram that illustrates a computer system in accordance with one or more embodiments.

For example, FIG. 6 is a block diagram that illustrates computer system 600 upon which an embodiment of the invention may be implemented. Computer system 600 includes bus 602 or other communication mechanism for communicating information, and a hardware processor 604 coupled with bus 602 for processing information. Hardware processor 604 may be, for example, a general purpose microprocessor.

Computer system 600 also includes main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes read only memory (ROM) 608 or other static storage device coupled to bus 602 for storing static information and instructions for processor

604. Storage device 610, such as a magnetic disk or optical disk, is provided and coupled to bus 602 for storing information and instructions.

Computer system 600 may be coupled via bus 602 to display 612, such as a cathode ray tube (CRT) or light emitting diode (LED) monitor, for displaying information to a computer user. Input device 614, which may include alphanumeric and other keys, is coupled to bus 602 for communicating information and command selections to processor 604. Another type of user input device is cursor control 616, such as a mouse, a trackball, touchscreen, or cursor direction keys for communicating direction information and command selections to processor 604 and for controlling cursor movement on display 612. Input device 614 typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 600 can receive the data on the network line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable medium storing instructions which, when executed by one or more hardware processors, causes:
generating, by a network service, a set of clusters that group a plurality of students by similarity;
training, by the network service, a machine-learning model based on variances in outcomes and actions leading to the outcomes for students that belong to a same cluster in the set of clusters;
evaluating, by the network service, the machine-learning model for a student that has been mapped to the same cluster in the set of clusters to identify at least one action that the student has not performed that is predictive of an optimal outcome for other students that belong to the same cluster;
responsive to evaluating the machine-learning model, presenting, by the network service through an interface, a recommendation that the student perform the at least one action.

2. The one or more non-transitory computer-readable media of claim 1, wherein generating the set of clusters that group students by similarity comprises generating a feature vector for each student of the plurality of students; assigning a respective student to a cluster in the plurality of clusters based on the distance of the feature vector to a cluster centroid.

3. The one or more non-transitory computer-readable media of claim 1, wherein the machine-learning model is one of a classification model or a regression model.

4. The one or more non-transitory computer-readable media of claim 1, wherein the at least one action comprises applying for a particular source of financial aid for which the student is predicted to be eligible.

5. The one or more non-transitory computer-readable media of claim 1, wherein the at least one action comprises adjusting an amount of financial aid accepted from a particular source of fund.

6. The one or more non-transitory computer-readable media of claim 5, wherein the at least one action includes reducing funds accepted from a first set of one or more sources and/or increasing funds accepted from a second set of one or more sources.

7. The one or more non-transitory computer-readable media of claim 1, wherein the at least one action comprises accessing a resource that is predicted to increase an academic outcome for the student.

8. The one or more non-transitory computer-readable media of claim 1, wherein the instructions further comprise presenting a link for performing the at least one action; responsive to a user selecting the link navigating to an interactive interface through which the at least one action may be completed.

9. The one or more non-transitory computer-readable media of claim 7, wherein the link initiates an application process for applying for a loan.

10. The one or more non-transitory computer-readable media of claim 1, wherein the optimal outcome is determined, based at least in part, on input received from an adviser.

11. The one or more non-transitory computer-readable media of claim 1, wherein the optimal outcome is determined automatically, based at least in part, on a set of rules and/or criteria for identifying optimal outcomes.

12. The one or more non-transitory computer-readable media of claim 1, wherein the optimal outcome is determined, based at least in part, on a student debt burdens for students in the same cluster.

13. The one or more non-transitory computer-readable media of claim 1, wherein the at least one action is recommended based on a learned pattern of behavior that leads to reduced student debt for students in the same cluster.

14. The one or more non-transitory computer-readable media of claim 1, wherein the at least one action is presented through at least one of a student interface or an adviser interface.

15. The one or more non-transitory computer-readable media of claim 1, wherein the machine-learning model is evaluated in real-time as a student is accessing the interface.

16. The medium of claim 1, wherein the instructions further cause monitoring, by the network service, for triggers that cause changes to current or projected outcomes for the plurality of students; and updating the machine-learning model based on detected changes to the current or projected outcomes for the plurality of students.

17. The one or more non-transitory computer-readable media of claim 16, wherein monitoring for triggers comprises receiving, by the network service from a network host, a RESTful message; parsing the RESTful message to identify updated student data for at least one student in the plurality of students; determining whether any outcomes are changed based on the updated student data; responsive to determining that an outcome is changed based on the updated student data, classifying the updated student data as a trigger.

18. The medium of claim 17, wherein the RESTful message is a SAFI message that comprises a snapshot of current attributes of a particular student.

19. A system comprising:
one or more hardware processors;
one or more non-transitory computer-readable media storing instructions which, when executed by one or more hardware processors, causes:
generating, by a network service, a set of clusters that group a plurality of students by similarity;
training, by the network service, a machine-learning model based on variances in outcomes and actions leading to the outcomes for students that belong to a same cluster in the set of clusters;
evaluating, by the network service, the machine-learning model for a student that has been mapped to the same cluster in the set of clusters to identify at least one action that the student has not performed that is predictive of an optimal outcome for other students that belong to the same cluster;
responsive to evaluating the machine-learning model, presenting, by the network service through an interface, a recommendation that the student perform the at least one action.

20. A method comprising
generating, by a network service, a set of clusters that group a plurality of students by similarity;
training, by the network service, a machine-learning model based on variances in outcomes and actions leading to the outcomes for students that belong to a same cluster in the set of clusters;
evaluating, by the network service, the machine-learning model for a student that has been mapped to the same cluster in the set of clusters to identify at least one action that the student has not performed that is predictive of an optimal outcome for other students that belong to the same cluster;

responsive to evaluating the machine-learning model, presenting, by the network service through an interface, a recommendation that the student perform the at least one action.

* * * * *

UNITED STATES PATENT AND TRADEMARK OFFICE
CERTIFICATE OF CORRECTION

PATENT NO. : 11,423,501 B2
APPLICATION NO. : 16/565963
DATED : August 23, 2022
INVENTOR(S) : Refila et al.

It is certified that error appears in the above-identified patent and that said Letters Patent is hereby corrected as shown below:

In the Claims

In Column 25, Line 5, in Claim 1, delete "medium" and insert -- media --, therefor.

In Column 26, Line 17, in Claim 16, delete "medium" and insert -- one or more non-transitory computer-readable media --, therefor.

In Column 26, Line 33, in Claim 18, delete "medium" and insert -- one or more non-transitory computer-readable media --, therefor.

Signed and Sealed this
Fourteenth Day of February, 2023

Katherine Kelly Vidal
*Director of the United States Patent and Trademark Office*